(12) United States Patent
Liang et al.

(10) Patent No.: US 8,649,280 B2
(45) Date of Patent: Feb. 11, 2014

(54) MOBILE COMMUNICATION SYSTEM, BASE STATION, USER EQUIPMENT, AND COMMUNICATION METHOD

(75) Inventors: Yongming Liang, Shanghai (CN); Renmao Liu, Shanghai (CN); Chongguang Yan, Shanghai (CN); Ming Ding, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 405 days.

(21) Appl. No.: 12/670,196

(22) PCT Filed: Jul. 23, 2008

(86) PCT No.: PCT/CN2008/001355
§ 371 (c)(1),
(2), (4) Date: Apr. 26, 2010

(87) PCT Pub. No.: WO2009/012655
PCT Pub. Date: Jan. 29, 2009

(65) Prior Publication Data

US 2011/0007643 A1 Jan. 13, 2011

(30) Foreign Application Priority Data

Jul. 24, 2007 (CN) .......................... 2007 1 0138617

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl.
USPC ........... 370/252; 370/329; 370/332; 370/341; 370/437; 455/450; 455/452.2; 455/509; 455/513

(58) Field of Classification Search
USPC .......... 370/329, 341, 437, 332, 252; 455/450, 455/509, 513, 452.2
See application file for complete search history.

(56) References Cited

U.S. PATENT DOCUMENTS

| 2005/0201474 A1 | 9/2005 | Cho et al. |
|---|---|---|
| 2006/0089102 A1 | 4/2006 | Nishio et al. |
| 1,598,284 A | 8/1926 | Kinney |

(Continued)

FOREIGN PATENT DOCUMENTS

| CN | 1428946 A | 7/2003 |
|---|---|---|
| CN | 1708149 A | 12/2005 |

(Continued)

OTHER PUBLICATIONS

Motorola Inc., R1-070779, "CQI Feedback Schemes for E-UTRA,"St. Louis, US, Feb. 12-16, 2007, pp. 1-5.

(Continued)

*Primary Examiner* — Benjamin H Elliott, IV
(74) *Attorney, Agent, or Firm* — Birch, Stewart, Kolasch & Birch, LLP

(57) ABSTRACT

A method for adaptively deciding number of feedback resource blocks in a downlink which comprises that a base station (500) determines a mode corresponding to the number of the feedback resource blocks which a user equipment feeds back by monitoring performance of a wireless cell and number of the user equipments (100) and transmits the mode to the user equipments (100) through signaling; the user equipments (100) listens to the mode and adaptively decides the number of feedback resource blocks by conditions of itself and feeds back downlink channel quality indicator information to the base station (500) according to Best channel quality indicator number or Threshold based feedback algorithm; and the base station (500) performs resource scheduling according to the feedback information. The present invention provides a method for adaptively deciding the number of feedback resource blocks based on base station signaling and user equipment decision, with respect to Best channel quality indicator number or Threshold based feedback algorithm in downlinks, thus insuring the performance of the wireless cell.

29 Claims, 14 Drawing Sheets

(56) References Cited

U.S. PATENT DOCUMENTS

| | | |
|---|---|---|
| 1,690,995 A | 11/1928 | Pratt |
| 1,180,466 A | 6/1931 | Deutsch |
| 1,810,466 A | 6/1931 | Deutsch |
| 1,598,284 A | 8/1926 | Kinney |
| 1,690,995 A | 11/1928 | Pratt |
| 1,180,466 A | 6/1931 | Deutsch |
| 1,810,466 A | 6/1931 | Deutsch |
| 1,598,284 A | 8/1926 | Kinney |
| 1,690,995 A | 11/1928 | Pratt |
| 1,180,466 A | 6/1931 | Deutsch |
| 1,810,466 A | 6/1931 | Deutsch |
| 1,810,466 A | 6/1931 | Deutsch |
| 2008/0188260 A1* | 8/2008 | Xiao et al. .................. 455/522 |
| 2009/0046592 A1* | 2/2009 | Aoyama et al. ............. 370/252 |
| 2009/0104877 A1 | 4/2009 | Nishio et al. |
| 2009/0268624 A1* | 10/2009 | Imamura et al. ............ 370/252 |
| 2010/0220608 A1* | 9/2010 | Skillermark et al. ........ 370/252 |
| 2011/0007643 A1* | 1/2011 | Liang et al. ................. 370/252 |

FOREIGN PATENT DOCUMENTS

| | | |
|---|---|---|
| CN | 1870468 A | 11/2006 |
| CN | 1946000 A | 4/2007 |
| EP | 1879403 A1 | 1/2008 |
| JP | 2004-208234 A | 7/2004 |
| WO | WO-2007/052769 A1 | 5/2007 |
| WO | WO 2007/073121 A1 | 6/2007 |

OTHER PUBLICATIONS

Nokia Corporation, R1-070388, "Reduced CQI Design for DL SU-MIMO," Sorrento, Italy, Jan. 15-19, 2007, pp. 1-7.

Qualcomm Inc., R1-061525, "System Analysis for UL SIMO SC-FDMA," Shanghai, China, May 8-12, 2006, pp. 1-10.

* cited by examiner

Transmit modes for feedback RB $h, i, j, k, l, m, n \in \{1, 2, 3, \cdots, K\}$

Transmit modes for feedback RB $h, i, j, k, l, m, n \in \{1, 2, 3, \cdots, K\}$

Transmit numbers for feedback RB

Transmit numbers for feedback RB

MOBILE COMMUNICATION SYSTEM, BASE STATION, USER EQUIPMENT, AND COMMUNICATION METHOD

TECHNICAL FIELD

The present invention relates generally to decision method in wireless communications. More specifically, the present invention relates to a method for adaptively deciding number of feedback resources blocks in a downlink in wireless transmission technology domain.

BACKGROUND ART

Wireless communication services develop rapidly and user number of various wireless networks continuously increases nowadays. However, a main challenge for the wireless services still is whether the wireless services are able to provide high rate and high performance services. People expect mitigating air multi-path interferences with Orthogonal Frequency Division Multiplexing (OFDM) technology and improving capacity of wireless cells with Multiple Input Multiple Output (MIMO) technology, thus how to improve overall data throughput and edge data throughput of the wireless cells on basis of guaranteeing quality of service (QoS) becomes an important index for scaling QoS of the wireless cells. Because MIMO may achieve high data throughput, IMT-2000 (International Mobile Telecommunications-2000) standard in the 3rd Generation Partnership Project (3GPP) has considered adopting MIMO technology. In the 3rd mobile communication technologies, a base station (BS) makes use of channel state information (CSI) fed back from a user equipment (UE) and changes data transmission rate of transmitter of the base station by adaptive modulation-coding technology. At present, in Super third generation (S3G) cellular mobile communication system, IEEE 802.16 system and WiMAX wireless metropolitan area network system defined by the Long Term Evolution ("LTE") Committee, it is proposed that the base station uses feedback information (FBI) from the user equipment to optimally design the transmitter so as to highly improve spectrum utilization efficiency. Accordingly, many companies propose feedback information based closed-loop transmission methods which allow the base station to adopt channel quality indicator (CQI) fed back from the user equipment to improve the system performance. Nevertheless, every company has different ideas and schemes on how each user equipment feeds back the CQI information and many companies propose their own CQI feedback schemes such as Bitmap feedback scheme, Best CQI (Best M/Top M) based feedback scheme, Hybrid feedback scheme, Threshold based feedback scheme, etc. After comparing implementation complexity of different feedback schemes with each other and taking into account that superior information feedback scheme is capable of reducing air overhead of feedback information without deteriorating or slightly impairing closed-loop system performance, it is concluded that the best CQI feedback scheme proposed by Motorola Inc. and the Threshold based feedback scheme proposed by Nokia Corporation (Finland) have advantages that principle is simple and it is easy to be carried out, so theses two schemes are possible to be widely applied in the near future. However, so far proposals and relative propositions on "how to decide number of feedback resource blocks in best CQI feedback scheme or Threshold based feedback scheme" have not been brought forward.

Motorola Inc. (USA) released Document R1-070779 "CQI Feedback Scheme for E-UTRA" during 3GPP TSG RAN Meeting No. 48 on Apr. 12-16, 2007 in St. Louis, USA. This document mentions a best feedback number based feedback scheme in which each time the user equipment feeds back CQI information, it selects best M CQIs of resources blocks for feeding back these CQIs to the base station. However, this document does not mention how to determine the number of M.

Nokia Corporation (Finland) released Document R1-070388 "Reduced CQI Design for DL SU-MIMO" during 3GPP TSG RAN Meeting No. 47 on Jan. 15-19, 2007 in Sorrento, Italy. This document mentions a Threshold based feedback scheme in which each time the user equipment feeds back CQI information, it sets CQI threshold value and selects M CQIs of resources blocks which are higher than the threshold value. However, this document does not point out whether the number M is determined by the based station or the user equipment.

In view of these problems, there is need for a high efficient, simple and practical method for deciding the number of feedback resource blocks, which may improve the overall performance of the wireless cell and save spectrum resources of uplinks on the basis of saving signaling overhead at the base station side and reducing the user equipment complexity.

SUMMARY OF INVENTION

The present invention aims to overcome deficiencies of prior arts and provides a method for adaptively deciding number of feedback resource blocks based on base station signaling and user equipment decision and feeding back CQI information of resource blocks to the base station by Best M CQI or Threshold value manner. The adaptive decision method of present invention has high efficiency and is easy to be implemented.

According to the present invention, there is provided a mobile communication system in which a user equipment feeds back, to a base station, downlink channel quality indicator information related to a prescribed number of resource blocks. In the mobile communication system, the base station transmits, to the user equipment, a mode corresponding to the number of resource blocks; and the user equipment selects, among selectable resource blocks, resource blocks whose number is corresponding to the mode transmitted from the base station and calculates the downlink channel quality indicator information related to the selected resource blocks.

According to the present invention, there is provided another mobile communication system in which a user equipment feeds back, to a base station, downlink channel quality indicator information related to a prescribed number of resource blocks. In the mobile communication system, the base station transmits, to the user equipment, a mode corresponding to a performance metric of a cell managed by the base station; and the user equipment selects, among selectable resource blocks, resource blocks whose number is corresponding to the mode transmitted from the base station and calculating the downlink channel quality indicator information related to the selected resource blocks.

According to the present invention, there is provided a base station for receiving, from a user equipment, downlink channel quality indicator information related to a prescribed number of resource blocks. The base station includes a unit for transmitting, to the user equipment, a mode corresponding to the number of resource blocks; and a unit receiving, from the user equipment, the downlink channel quality indicator information related to resource blocks selected from selectable resource blocks, by the user equipment, according to the number of resource blocks corresponding to the mode.

According to the present invention, there is provided another base station for receiving, from a user equipment, downlink channel quality indicator information related to a prescribed number of resource blocks. The base station includes a unit for transmitting, to the user equipment, a mode corresponding to a performance metric of a cell managed by the base station; and a unit for receiving, from the user equipment, the downlink channel quality indicator information related to resource blocks selected among selectable resource blocks, by the user equipment, according to the number of resource blocks corresponding to the mode.

According to the present invention, there is provided a user equipment for transmitting, to a base station, downlink channel quality indicator information related to a prescribed number of resource blocks. The user equipment includes a unit for receiving, from the base station, a mode corresponding to the number of resource blocks; and a unit for selecting, among selectable resource blocks, resource blocks whose number is corresponding to the mode and for calculating the downlink channel quality indicator information related to the selected resource blocks.

According to the present invention, there is provided another user equipment for transmitting, to a base station, downlink channel quality indicator information related to a prescribed number of resource blocks. The user equipment includes a unit for receiving, from the base station, a mode corresponding to a performance metric of a cell managed by the base station; and a unit for selecting, among selectable resource blocks, resource blocks whose number is corresponding to the mode and for calculating the downlink channel quality indicator information related to the selected resource blocks.

According to the present invention, there is provided a communication method of a base station for receiving, from a user equipment, downlink channel quality indicator information related to a prescribed number of resource blocks. The method includes steps of transmitting, to the user equipment, a mode corresponding to the number of resource blocks; and receiving, from the user equipment, the downlink channel quality indicator information related to resource blocks selected from selectable resource blocks, by the user equipment, according to the number of resource blocks corresponding to the mode.

According to the present invention, there is provided another communication method of a base station for receiving, from a user equipment, downlink channel quality indicator information related to a prescribed number of resource blocks. The method includes steps of transmitting, to the user equipment, a mode corresponding to a performance metric of a cell managed by the base station; and receiving, from the user equipment, the downlink channel quality indicator information related to resource blocks selected among selectable resource blocks, by the user equipment, according to the number of resource blocks corresponding to the mode.

According to the present invention, there is provided a communication method of a user equipment for transmitting, to a base station, downlink channel quality indicator information related to a prescribed number of resource blocks. The method includes steps of a unit for receiving, from the base station, a mode corresponding to the number of resource blocks; and a unit for selecting, among selectable resource blocks, resource blocks whose number is corresponding to the mode and for calculating the downlink channel quality indicator information related to the selected resource blocks.

According to the present invention, there is provided another communication method of a user equipment for transmitting, to a base station, downlink channel quality indicator information related to a prescribed number of resource blocks. The method includes steps of a unit for receiving, from the base station, a mode corresponding to a performance metric of a cell managed by the base station; and a unit for selecting, among selectable resource blocks, resource blocks whose number is corresponding to the mode and for calculating the downlink channel quality indicator information related to the selected resource blocks.

In general, the present invention provides a base station and user equipment semi-static pattern which adaptively decides the number of feedback resource blocks according to a combination manner of base station signaling and user equipment decision; a base station dynamic pattern in which the base station individually determines the number of feedback resource blocks through signaling and a user equipment dynamic pattern in which the user equipment individually determines the number of feedback resource blocks according to conditions of the user equipment itself.

Comparing with the base station dynamic pattern, the semi-static pattern of the present invention undoubtedly saves signaling overhead, nevertheless the base station dynamic pattern does not increase the processing burden of the user equipment. Comparing with the user equipment dynamic pattern, the semi-static pattern of the present invention undoubtedly reduces the processing complexity of the user equipment, nevertheless the user equipment dynamic pattern does not need any signaling overhead.

Therefore, the semi-static, base station dynamic pattern and user equipment dynamic pattern have their own characteristics and are respectively applicable according to the actual states. The present invention may provide an important theory basis and a detailed implementation method for the closed-loop feedback scheme of systems such as Third Generation (3G), Super Third Generation (S3G), Fourth Generation (4G) cellular mobile communication and digital televisions, wireless local area network (WLAN), self-organized network (Mesh, Ad Hoc, Censor Network), electronic home (e-Home) network, wireless wide area network (WWAN), and etc.

BRIEF DESCRIPTION OF THE DRAWINGS

The foregoing and other objectives, features, and advantages of the invention will be more readily understood upon consideration of the following detailed description of the invention, taken in conjunction with the accompanying drawings.

DESCRIPTION OF EMBODIMENTS

Preferred embodiments will be explained by referring to the accompanying drawings. Unnecessary parts and functions for the present invention will be omitted for brevity so as to avoid confusion in understanding.

Figure 1:
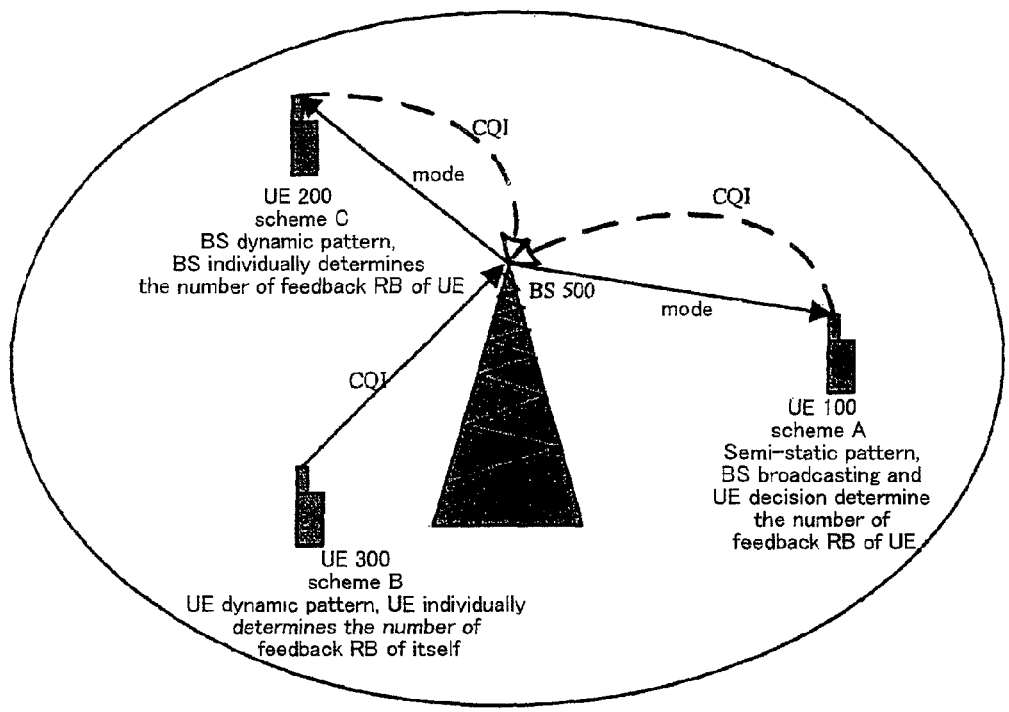
FIG. 1 is a schematic diagram illustrating decision of number of feedback resources blocks of a wireless cell.

As shown in FIG. 1, the present invention provides three kinds of methods for deciding number of feedback resources blocks in downlinks, which are base station dynamic pattern, user equipment dynamic pattern and base station and user equipment semi-static pattern. The base station dynamic pattern (between BS 500 and UE 200) does not augment burdens of any user equipment and is capable of deciding the number of feedback resource blocks in downlinks only through signaling. The user equipment dynamic pattern (between UE 300 and BS 500) needs not increase any signaling overhead and only requires the user equipment to decide the number of resource blocks in downlinks necessary to be fed back according to open/closed loop pattern, MIMO pattern (single user MIMO (SU-MIMO), multi-user MIMO (MU-MIMO), beam-forming MIMO, transmit diversity MIMO, etc.), service type, path loss, moving speed or bit error performance of the user equipment itself. The base station and user equipment semi-static pattern (between BS 500 and UE 100) adaptively decides the number of feedback resource blocks in downlinks according to the signaling of the base station and current condition of the user equipment itself.

Embodiment 1

Figure 13:
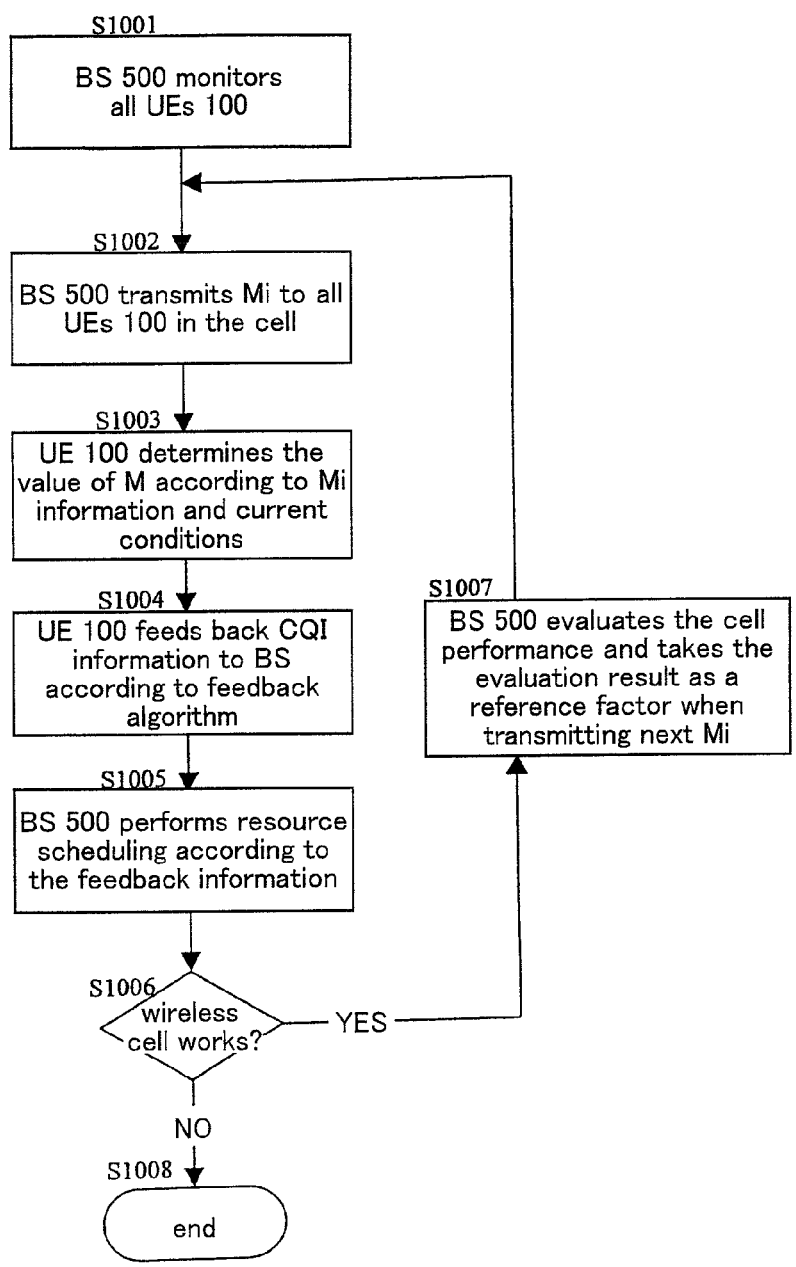
FIG. 13 is a flow chart illustrating mode based semi-static pattern.
Figure 14:
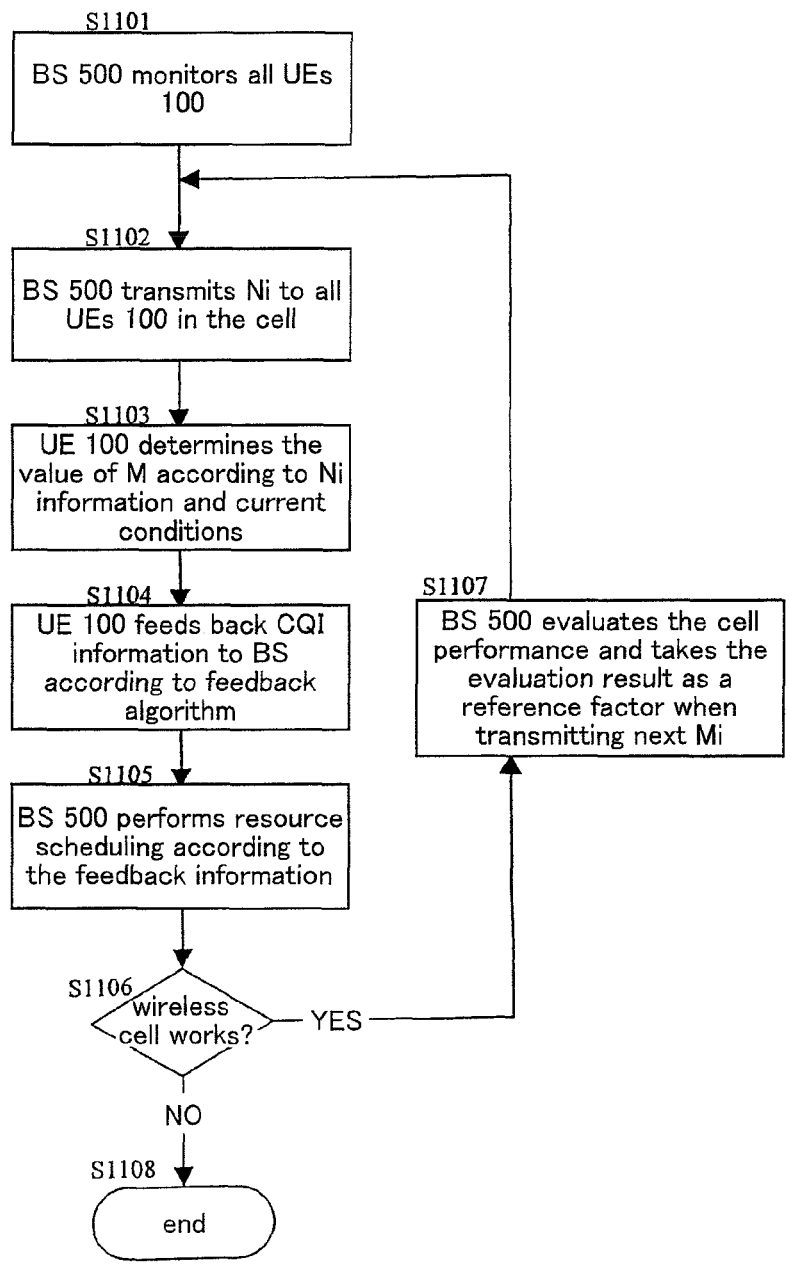
FIG. 14 is a flow chart illustrating reference number based semi-static pattern.

Semi-Static Pattern (FIG. 13 and FIG. 14)

the base station monitors all user equipments in an entire wireless cell (Steps S1001 and S1101).

Figure 2:
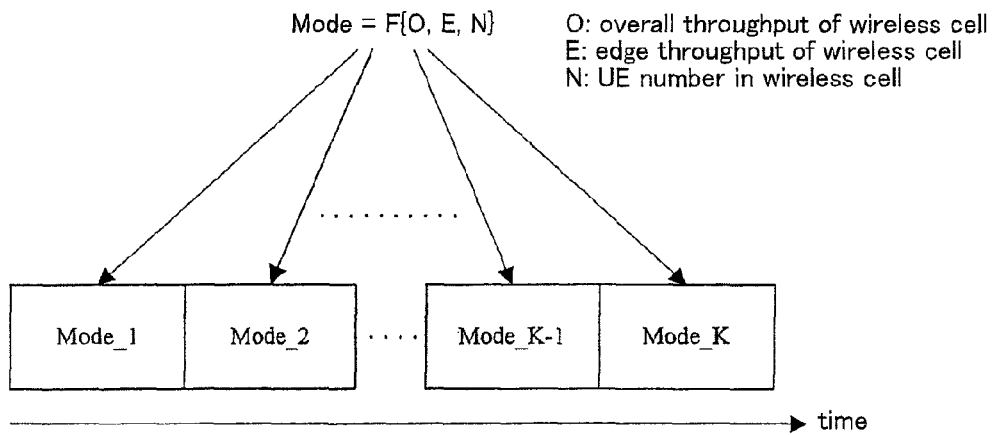
FIG. 2 is a schematic drawing illustrating a mode transmitted by a base station.

As shown in FIG. 1, in the semi-static pattern, the BS 500 determines K kinds of modes (Mode_1, Mode_2, . . . Mode_K−1, Mode_K as shown in FIG. 2) corresponding to the number of resource blocks which the user equipment feeds back based on metrics such as overall throughput O of the wireless cell, edge throughput E of the wireless cell, the number of UEs 100 N, etc. The principle of mode determination is guaranteeing communication fairness of user equipments and improving the overall or edge throughput of the wireless cell.

Figure 3:
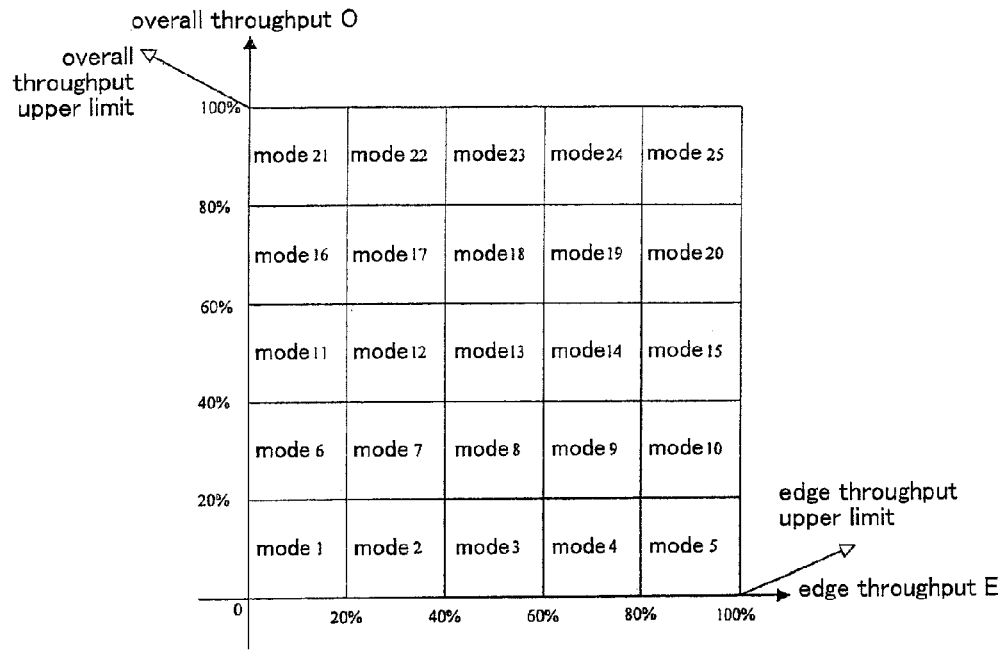
FIG. 3 is a schematic drawing illustrating a format of the mode transmitted by the base station.

FIG. 3 is a schematic drawing illustrating modes transmitted by the base station in which the base station divides the transmission mode into 25 modes according to the overall throughput O and edge throughput E of the wireless cell. Because the number of UEs 100 N directly affects the overall throughput O and edge throughput E of the wireless cell, the factor of the number of UEs 100 N has been taken into account at the time of mode division according to the overall throughput O and edge throughput E of the wireless cell.

Figure 4:
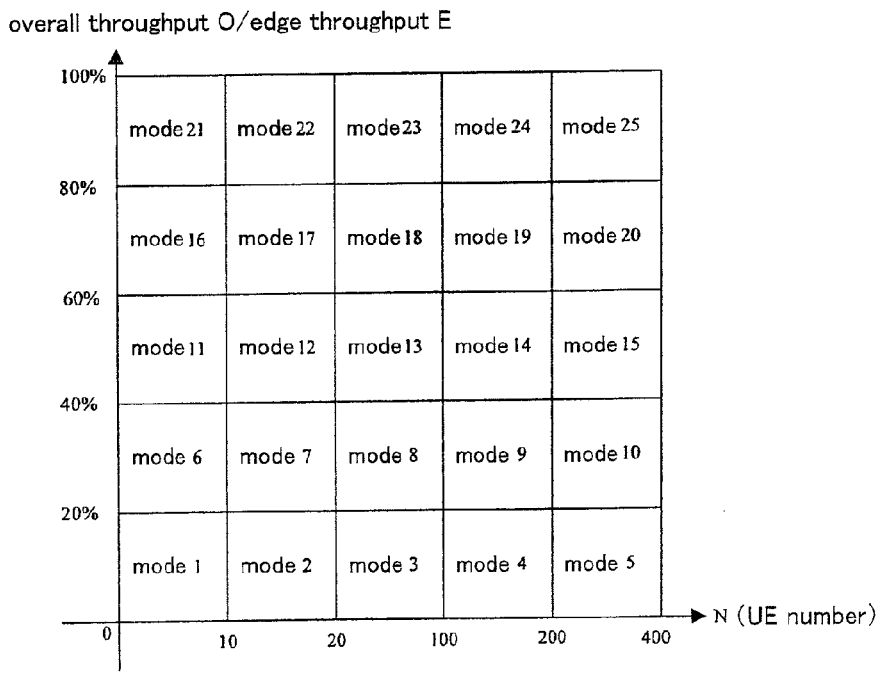
FIG. 4 is a schematic drawing illustrating another format of the mode transmitted by the base station.

FIG. 4 is a schematic drawing illustrating another type of modes transmitted by the base station in which the base station divides the transmission mode into 25 modes according to the throughput (overall throughput O and/or edge throughput E) of the wireless cell and the number of UEs 100, N.

Although FIG. 3 and FIG. 4 show two division manners, the factor of system bandwidth may be further considered so as to perform mode division according to the system bandwidth, user number and the throughput. In 3GPP LTE system, the divided modes shall also be able to be applied to cellular communication system with 1.25 MHz, 2.5 MHz, 5 MHz, 10 MHz, 15 MHz or 20 MHz bandwidth.

(2) the base station transmits K kinds of modes or K kinds of reference numbers of feedback resource blocks to all user equipments within the entire wireless cell through signaling manner (Steps S1002 and S1102).

Figure 5:
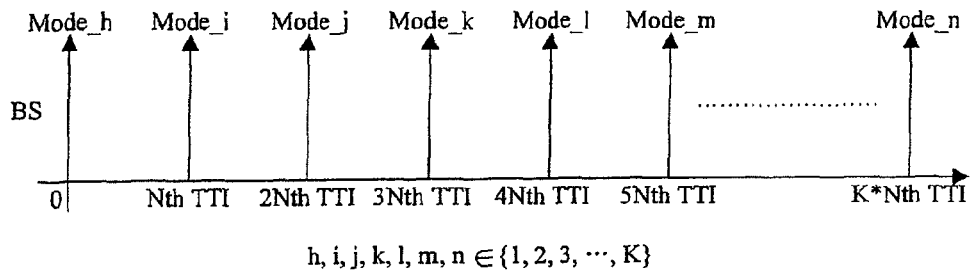
FIG. 5 is a schematic diagram illustrating periodical mode transmission of the base station.
Figure 6:
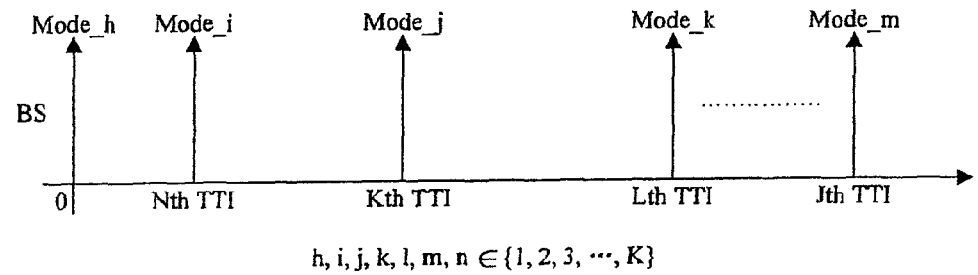
FIG. 6 is a schematic diagram illustrating aperiodical mode transmission of the base station.
Figure 7:
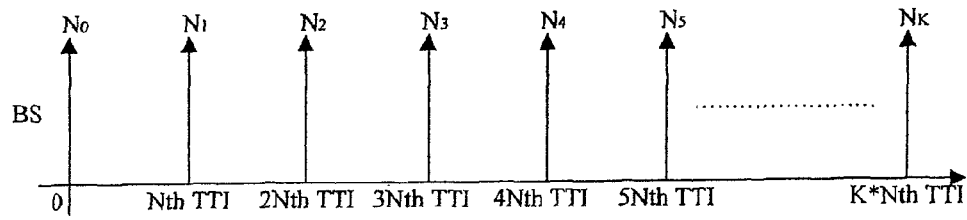
FIG. 7 is a schematic diagram illustrating that the base station transmits reference number periodically.
Figure 8:
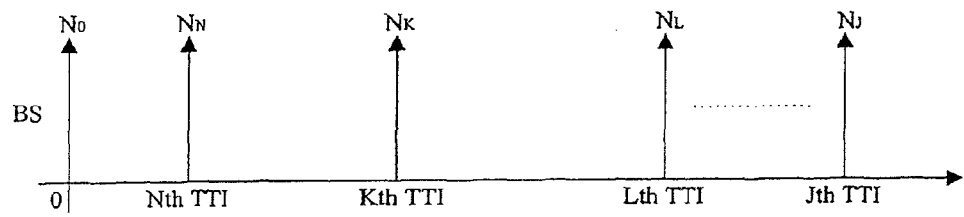
FIG. 8 is a schematic diagram illustrating that the base station transmits reference number aperiodically.

The base station transmits, to all N user equipments within the entire wireless cell, K kinds of modes (Mode_1, Mode_2, . . . , Mode_K−1, Mode_K as shown in FIG. 2) corresponding to the number of resource blocks which the user equipments feeds back through signaling manner. Each time the base station transmits the mode, it transmits only one mode and which mode is to be transmitted each time is determined according to metrics such as the overall throughput O of the wireless cell, edge throughput E of the wireless cell, the number, N, of user equipments, etc., rather than transmitting the modes sequentially. The base station may adopt not only broadcast channel (BCH) but also physical downlink control channel (PDCCH) to transmit signaling so as to transmit the modes. The base station may transmit the modes periodically as shown in FIG. 5 or may transmit the modes aperiodically as shown in FIG. 6. Please note that the base station is not limited to only transmit modes (corresponding to FIG. 13). The base station may alternatively transmit reference numbers of requisite feedback resource blocks (corresponding to FIG. 14). As shown in FIG. 7 it may be set that there are K kinds of reference numbers ($N_0, N_1, N_2, \ldots, N_K$). In like manner, the base station also transmits the reference numbers in dependence upon current determination result of the base station so that the base station may transmit the modes periodically as shown in FIG. 7 or may transmit the modes aperiodically as shown in FIG. 8. The signaling transmission of the base station may adopt not only the broadcast channel (BCH) for signaling but also the physical downlink control channel (PDCCH) for signaling.

(3) each user equipment within the wireless cell listens to the above described modes and performs decision (Steps S1003 and S1103).

Figure 9:
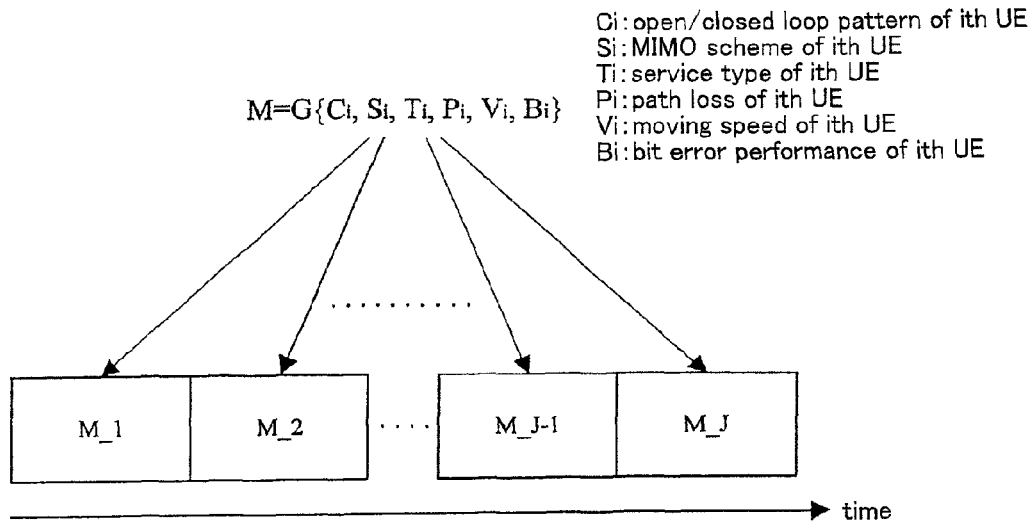
FIG. 9 is a schematic diagram illustrating that a user equipment decides feedback number.
Figure 10:
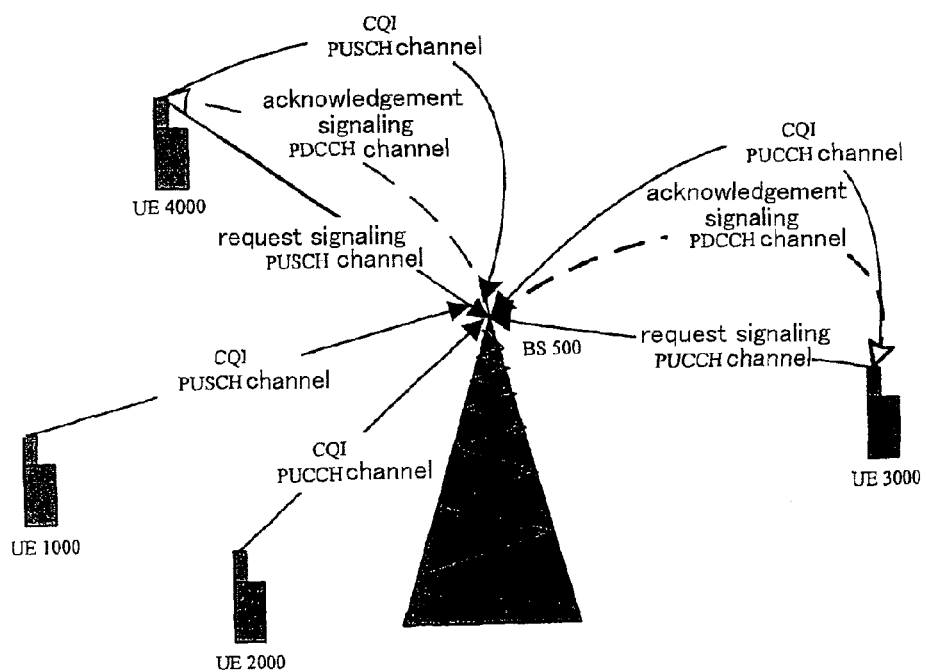
FIG. 10 is a schematic diagram illustrating that the user equipment transmits uplink signaling.

As shown in FIG. 9, each user equipment within the wireless cell listens to the above described modes and adaptively decides the number, M, of the resource blocks which is needed to be fed back according to open/closed loop pattern $C_i$, MIMO pattern $S_i$ (Single User MIMO, Multi-user MIMO, beam-forming MIMO, transmit diversity MIMO, etc.), service type $T_i$, path loss $P_i$, moving speed $V_i$ or bit error performance $B_i$ of the user equipment itself. As shown in FIG. 10, when the UE 1000 has data to be sent to the BS 500, the UE 1000 transmits M CQI values to the BS 500 through a physical uplink shared channel (PUSCH), and the UE 2000 transmits M CQI values to the BS 500 through a physical uplink control channel (PUCCH) in case of having no data to be sent to the BS 500. Please note that the number, M, of resource blocks which is necessary to be fed back and which is decided each time may be different from each other and thus may be assigned with a value from the group of M_1, M_2, . . . , M_J−1 and M_J (as shown in FIG. 9).

Each user equipment may alternatively determine the number, M, of resource blocks which is necessary to be fed back through signaling manner. As shown in FIG. 10, the UE 3000 transmits a request signaling to the BS 500 through the physical uplink control channel (PUCCH) when having no data to be sent to the BS 500. After receiving the request signaling, the BS 500 returns an acknowledgement signal to the UE 3000 through a physical downlink control channel (PDCCH). According to the acknowledgement signal, the UE 3000 transmits M CQI values to the BS 500 through the physical uplink control channel (PUCCH). The UE 4000 transmits a request signaling to the BS 500 through the physical uplink shared channel (PUSCH) when having data to be sent to the BS 500. After receiving the request signaling, the BS 500 returns an acknowledgement signal to the UE 4000 through the physical downlink control channel (PDCCH). According to the acknowledgement signal, the UE 4000 transmits M CQI values to the BS 500 through the physical uplink shared channel (PUSCH).

(4) the user equipment feeds back downlink channel quality indicator information (Steps S1004 and S1104).

Figure 11:
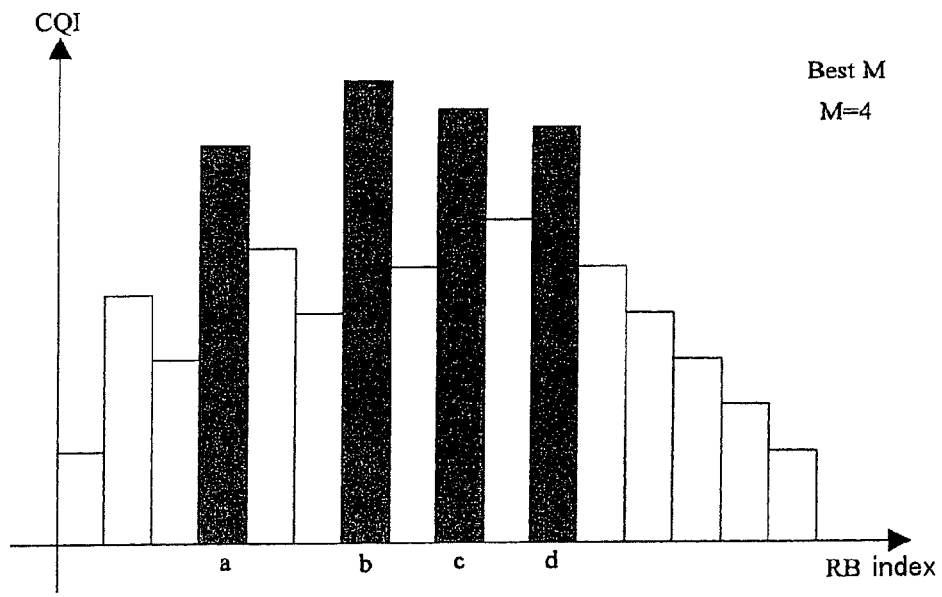
FIG. 11 is a schematic diagram illustrating Best M based feedback algorithm.

As shown in FIG. 11, the user equipment feeds back the downlink channel quality indicator information to the base station according to best channel quality indicator (Best M) based feedback algorithm. In FIG. 11, the feedback number M is 4, so the Best M based feedback algorithm will feed back the best four CQI values of resource blocks (RB). The detailed contents of the Best M based feedback algorithm may refer to Document R1-070779 "CQI Feedback Scheme for E-UTRA" released during 3GPP TSG RAN Meeting No. 48 on Apr. 12-16, 2007 in St. Louis, USA by Motorola Inc. (USA).

Figure 12:
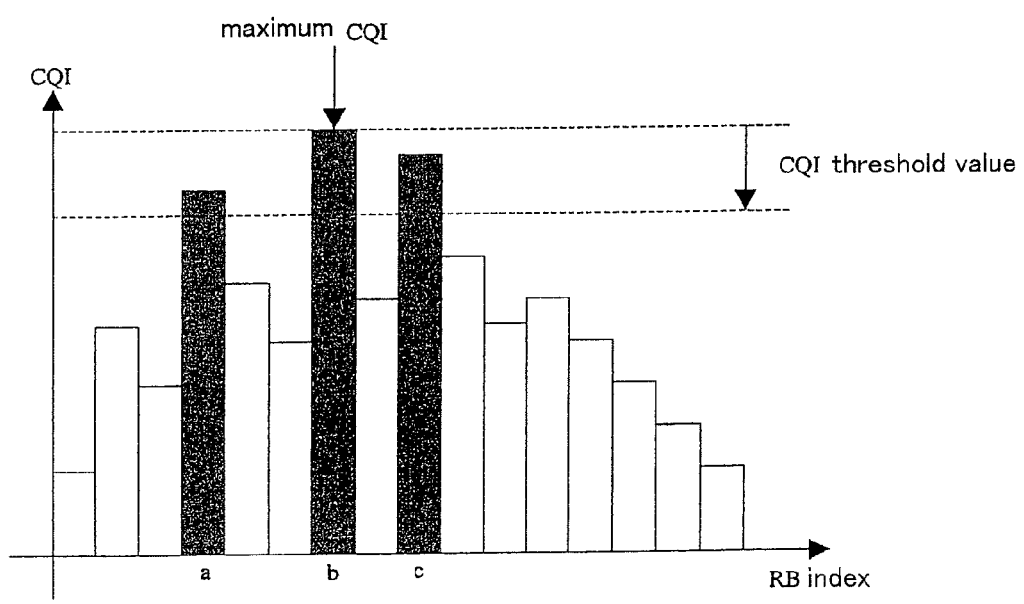
FIG. 12 is a schematic diagram illustrating Threshold based feedback algorithm.

As shown in FIG. 12, the user equipment feeds back the downlink channel quality indicator information to the base station according to Threshold based feedback algorithm, rather than the Best M based feedback algorithm. In FIG. 12, the feedback number M is 3, so the Threshold based feedback procedure will feed back three CQI values of RBs, which are higher than the threshold value. The detailed contents of the Threshold based feedback algorithm may refer to Document R1-070388 "Reduced CQI Design for DL SU-MIMO" released during 3GPP TSG RAN Meeting No. 47 on Jan. 15-19, 2007 in Sorrento, Italy by Nokia Corporation (Finland).

(5) the base station performs resource scheduling (Steps S1005 and S1105).

As shown in FIG. 13, the base station may perform the resource scheduling according to the channel quality indicator information fed back by the user equipment on the basis of mode transmission. Similarly, as shown in FIG. 14, the base station may alternatively perform the resource scheduling according to the channel quality indicator information fed back by the user equipment on the basis of reference number transmission. The resource scheduling may also adopt proportion fairness scheme, maximum throughput scheme or other scheduling schemes. The present invention adopts a proportion fairness scheme as shown in FIG. 15.

Figure 15:
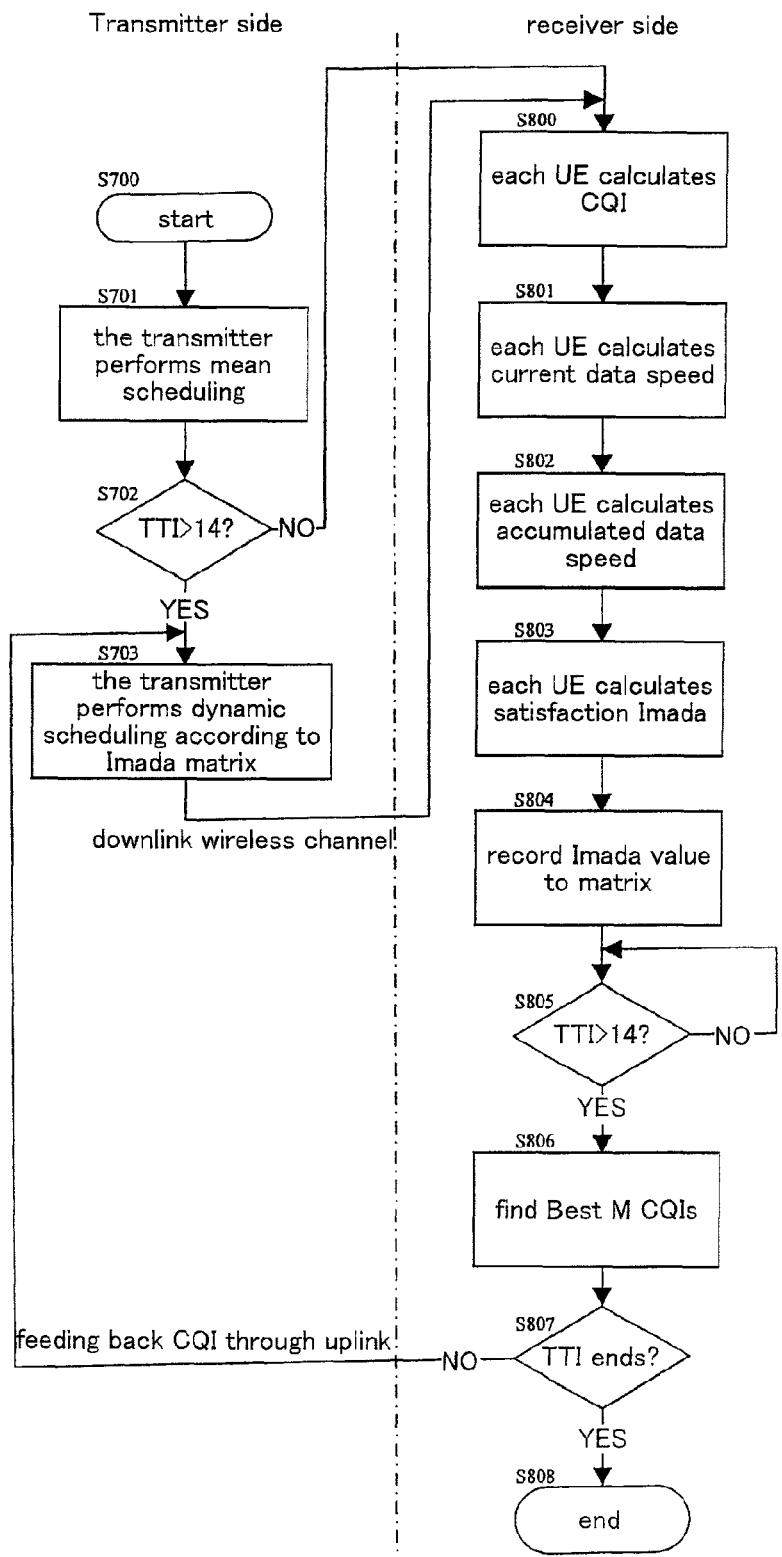
FIG. 15 is a flow chart illustrating proportion fairness algorithm.

In FIG. 15, firstly at Step S700, a transmitter starts the proportion fairness scheme adopted by the present invention. The transmitter performs mean scheduling, i.e., averagely allocating 50 resource blocks with 10 MHz bandwidth to all UEs (Step S701). The transmitter determines whether transmission time interval TTI is larger than 14 (Step S702) in which the value 14 is selected as reference value based on practice requirements and may be set as other value according to practice situations. For example, since the number of all UEs in the wireless cell is 14 in the embodiment, averagely allocated TTI number is set as 14. If TTI is larger than 14, a dynamic scheduling algorithm will be adopted and the principle of the dynamic scheduling algorithm is magnitude of element in Imada matrix where the larger the absolute value of the element, the higher the priority of the dynamic scheduling is. At step S800, a receiver calculates CQI value for each UE based on the received data. Each UE calculates current data rate (Step S801). Each UE calculates and obtains accumulated data rate (Step S802). Each UE calculates satisfaction Imada of the user equipment itself according to the current data rate and the accumulated data rate (Step S803). All UEs record Imada values to an Imada matrix (Step S804). It is determined whether TTI is larger than 14 (Step S805). If larger than 14, the best M CQI values of RBs from all RBs are searched out (Step S806). At Step S807, the best M CQI values of the RBs are fed back to the base station. The detailed contents on the proportion fairness scheme may refer to Document "System Analysis for UL SIMO SC-FDMA" released during 3GPP TSG RAN WG1 Meeting No. 45 on May 8-12, 2006 in Shanghai, China by Qualcomm Inc. (USA).

(6) whether the wireless cell continues to work is determined (Steps S1006 and S1106).

As shown in FIG. 13 and FIG. 14, in Steps S1006 and S1106, whether the wireless cell continues to work is determined. If it is determined that the wireless cell continues to work, the procedure returns to Step S1002 and Step S1102 respectively. If the wireless cell has stopped working, the procedure ends as shown in Step S1008 or Step S1108.

(7) the base station measures and evaluates performance of the wireless cell (Steps S1007 and S1107).

As shown in FIG. 13 and FIG. 14, the base station measures and evaluates the performance of the wireless cell, which comprises measuring the overall throughput of the wireless cell, the edge throughput of the wireless cell, the number of user equipments, etc. The base station further takes the evaluation results as reference factors used for determining next mode or reference number.

As shown in FIG. 13 and FIG. 14, the normal operations of the base station and all user equipments of the wireless cell are guaranteed by repeatedly performing above steps (1) to (7).

Embodiment 2

Figure 17:
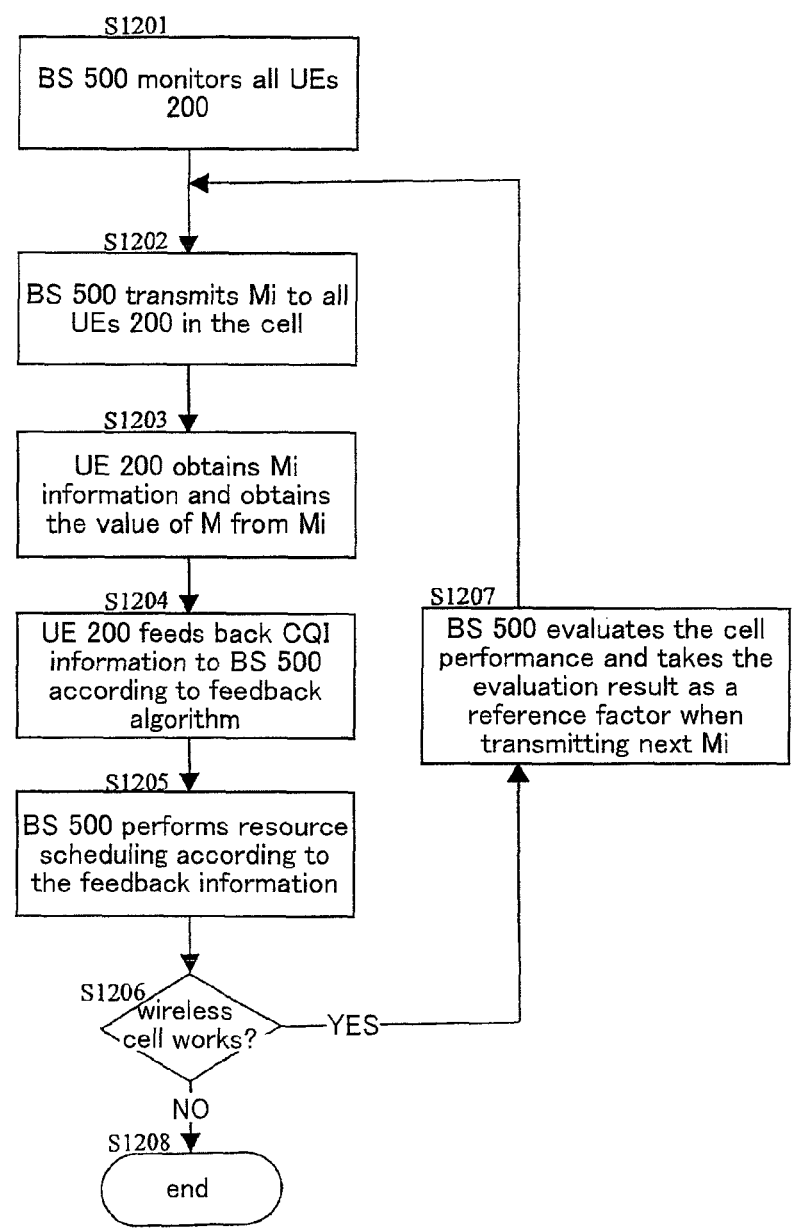
FIG. 17 is a flow chart illustrating mode based BS dynamic pattern.
Figure 18:
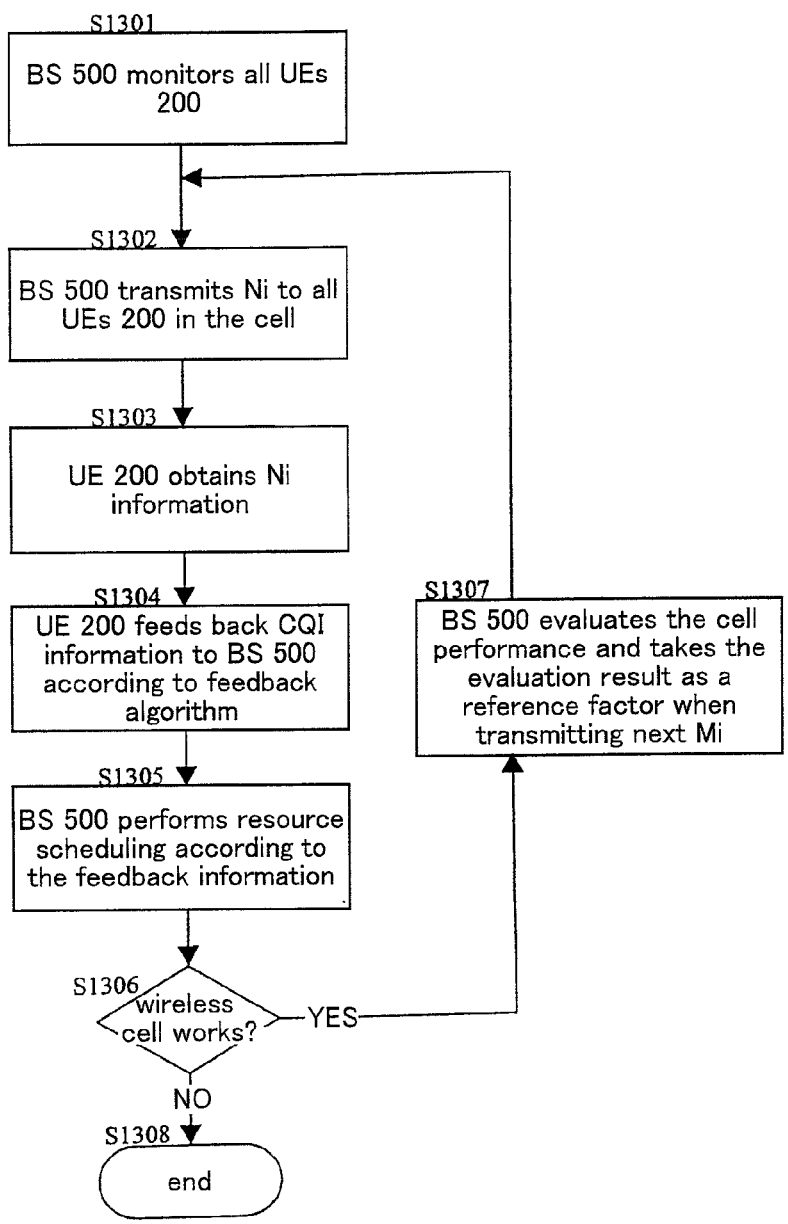
FIG. 18 is a flow chart illustrating reference number based BS dynamic pattern.

BS Dynamic Pattern (FIG. 17 and FIG. 18)

the base station monitors all user equipments in an entire wireless cell (Steps S1201 and S1301).

Figure 16:
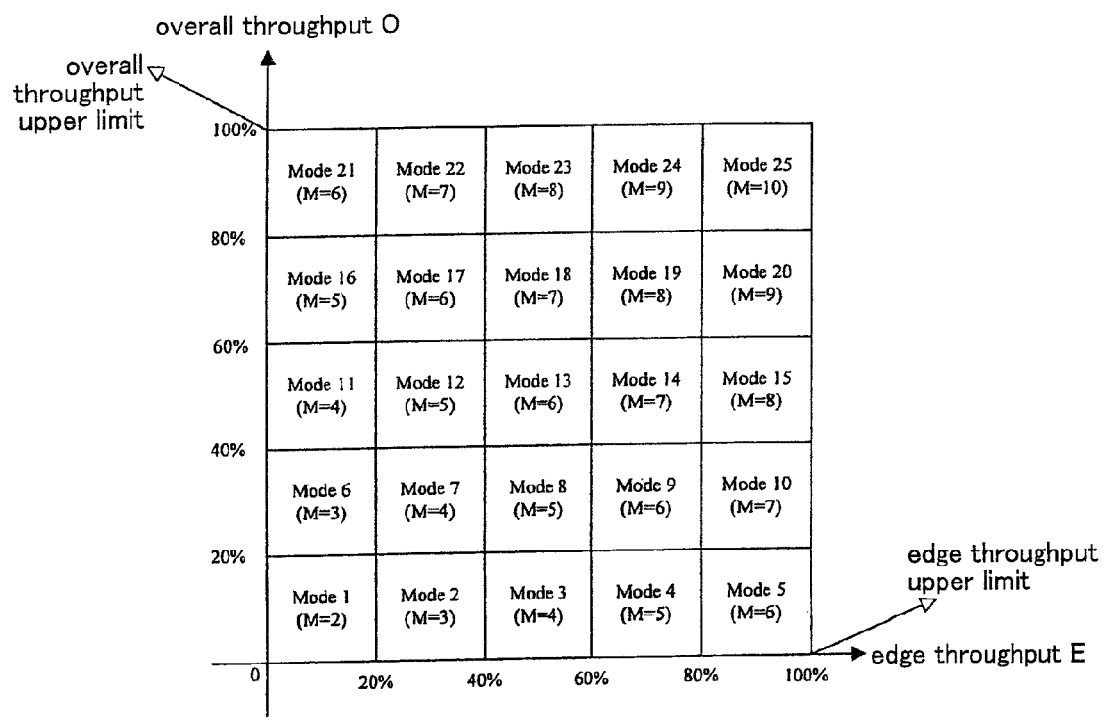
FIG. 16 illustrates format of BS dynamic pattern based mode which is transmitted by the base station.

As shown in FIG. 1, in the BS dynamic pattern, the BS 500 determines K kinds of modes (Mode_1, Mode_2, . . . Mode_K−1, Mode_K as shown in FIG. 2) corresponding to the number of resource blocks which the UE 200 feeds back based on metrics such as overall throughput O of the wireless cell, edge throughput E of the wireless cell, the number of UEs 200, etc. The principle of the mode determination is guaranteeing communication fairness of each user equipment and improving the overall or edge throughput of the wireless cell. Each mode corresponds to one number (M) of resource blocks that should be fed back as shown in FIG. 16.

(2) the base station transmits K kinds of modes or K kinds of reference numbers of feedback resource blocks to all user equipments within the entire wireless cell through signaling manner (Steps S1202 and S1302).

The base station transmits, to all N user equipments within the entire wireless cell, K kinds of modes (Mode_1, Mode_2, ..., Mode_K–1, Mode_K as shown in FIG. 2) corresponding to the number of resource blocks which the user equipment feeds back through the signaling manner. Each time the base station transmits the mode, it transmits only one mode and which mode is to be transmitted each time is determined according to metrics such as the overall throughput O of the wireless cell, edge throughput E of the wireless cell, the number, N, of user equipments, etc., rather than transmitting the modes sequentially. The base station may adopt not only broadcast channel (BCH) but also the physical downlink control channel (PDCCH) to transmit signaling so as to transmit the modes. The base station may transmit the modes periodically as shown in FIG. 5 or may transmit the modes aperiodically as shown in FIG. 6. Please note that the base station is not limited to being able to only transmit modes (corresponding to FIG. 17). The base station may alternatively transmit the requisite reference number of feedback resource blocks (corresponding to FIG. 18). As shown in FIG. 7 it may be arranged such that there are K kinds of reference numbers ($N_0, N_1, N_2, \ldots, N_k$). In like manner, the base station also transmits the reference number in dependence upon current determination result of the base station. The base station may transmit the modes periodically as shown in FIG. 7 or may transmit the modes aperiodically as shown in FIG. 8. The signaling transmission of the base station may adopt not only the broadcast channel (BCH) for signaling but also the physical downlink control channel (PDCCH) for signaling.

(3) each user equipment within the wireless cell listens to the above described modes (Steps S1203 and S1303).

Each user equipment within the wireless cell listens to the above described modes.

(4) the user equipment feeds back downlink channel quality indicator information (Steps S1204 and S1304).

As shown in FIG. 11, the user equipment feeds back the downlink channel quality indicator information to the base station according to the Best channel quality indicator (Best M) based feedback algorithm.

As shown in FIG. 12, the user equipment may alternatively feed back the downlink channel quality indicator information to the base station according to the Threshold based feedback algorithm, rather than the Best M based feedback algorithm.

(5) the base station performs the resource scheduling (Steps S1205 and S1305)

As shown in FIG. 17, the base station may perform the resource scheduling according to the channel quality indicator information fed back by the user equipment on the basis of mode transmission. Similarly, as shown in FIG. 18, the base station may alternatively perform resource scheduling according to the channel quality indicator information fed back by the user equipment on the basis of transmission of the number of the feedback resource blocks.

(6) whether the wireless cell continues to work is determined (Steps S1206 and S1306).

As shown in FIG. 17 and FIG. 18, in Steps S1206 and S1306, whether the wireless cell continues to work is determined. If it is determined that the wireless cell continues to work, the procedure returns to Step S1202 and Step S1302 respectively. If the wireless cell has stopped working, the procedure ends as shown in Step S1208 or Step S1308.

(7) the base station measures and evaluates performance of the wireless cell (Steps S1207 and S1307).

As shown in FIG. 17 and FIG. 18, the base station measures and evaluates the performance of the wireless cell, which comprises measuring the overall throughput of the wireless cell, the edge throughput of the wireless cell, the number of user equipments, etc. The base station further takes the evaluation results as reference factors used for determining next mode or reference number.

As shown in FIG. 17 and FIG. 18, the normal operations of the base station and all user equipments of the wireless cell are guaranteed by repeatedly performing above steps (1) to (7).

Embodiment 3

Figure 19:
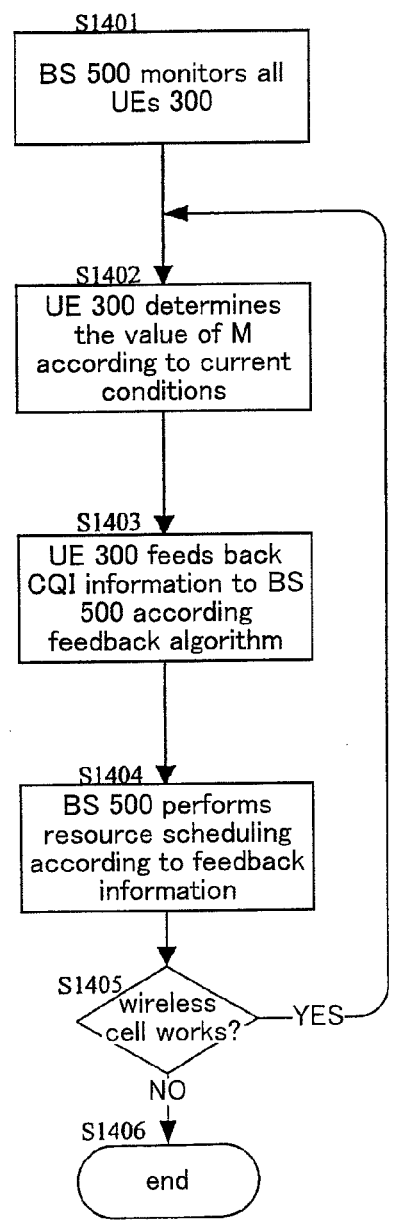
FIG. 19 is a flow chart illustrating UE dynamic pattern.

UE Dynamic Pattern (FIG. 19)

the base station monitors all user equipments in an entire wireless cell (Step S1401).

As shown in FIG. 1, in the UE dynamic pattern, the BS 500 monitors all user equipments in the entire wireless cell and calculates metrics such as overall throughput O of the wireless cell, edge throughput E of the wireless cell, the number of UEs 200, etc.

(2) each user equipment within the wireless cell listens to the above described modes and performs decision (Step S1402).

Each UE 300 within the wireless cell adaptively decides the number of resource blocks (as shown in FIG. 9) which needs to be fed back according to open/closed loop pattern $C_i$, MIMO pattern $S_i$ (Single User MIMO, Multi-user MIMO, beam-forming MIMO, transmit diversity MIMO, etc.), service type $T_i$, path loss $P_i$, moving speed $V_i$ or bit error performance $B_i$ of the user equipment itself.

(3) the user equipment feeds back downlink channel quality indicator information (Step S1403).

As shown in FIG. 11, the user equipment feeds back channel quality indicator information to the base station by the best channel quality indicator (Best M) based feedback algorithm.

As shown in FIG. 12, the user equipment feeds back channel quality indicator information to the base station by the Threshold based feedback algorithm, instead of the Best M based feedback algorithm.

(4) the base station performs resource scheduling (Step S1404).

As shown in FIG. 19, the base station performs the resource scheduling according to the channel quality indicator information fed back by the user equipment.

(5) whether the wireless cell continues to work is determined (Step S1405).

As shown in FIG. 19, in Step S1405, whether the wireless cell continues to work is determined. If it is determined that the wireless cell continues to work, the procedure returns to Step S1402. If the wireless cell has stopped working, the procedure ends as shown in Step S1406.

As shown in FIG. 19, the normal operations of the base station and all user equipments of the wireless cell are guaranteed by repeatedly performing above steps (1) to (5).

The adaptive decision method for the number of feedback resources blocks in downlinks according to the present invention is all-purpose and is adaptive to downlinks of general communication system as shown in Table 1. Each of the three decision methods of present invention has its strong and weak points.

BS dynamic pattern: the base station determines individually the number of feedback resource blocks through signaling transmission. Processing procedure of this pattern is simple but the signaling overhead is too large.

UE dynamic pattern: the UE determines individually the number of feedback resource blocks according to conditions of itself. This pattern does not need signaling overhead, but the burden of the user equipment is heavy and there is no cooperation between UEs, resulting low overall system performance.

Mode based BS+UE semi-static pattern: the base station and user equipment together determine the number of feedback resource blocks. This pattern may save signaling overhead and achieve high overall system performance, but needs a small quantity of signaling overhead.

Reference number based BS+UE semi-static pattern: this pattern has substantially same characteristics to those of the mode based BS+UE semi-static pattern. The base station and user equipment together determine the number of feedback resource blocks. This pattern may save signaling overhead and achieve high overall system performance, but needs a small quantity of signaling overhead.

In comparison with the mode based BS+UE semi-static pattern, signaling of the reference number based BS+UE semi-static pattern is more complicated, since the UE needs to refer to the reference number sent from the BS when determining the actual number of feedback resource blocks. Therefore, the more the variety of the reference numbers determined by the BS, the more significant the reference meaning for determining the actual number of feedback resource blocks is.

TABLE 1

| Method | Procedure | Advantage | Disadvantage |
| --- | --- | --- | --- |
| BS dynamic pattern | BS determines individually the number of feedback resource blocks through signaling transmission | Simple processing procedure | Large signaling overhead |
| UE dynamic pattern | UE determines individually the number of feedback resource blocks according to conditions of itself | No signaling overhead | Heavy UE burden and low overall system performance for lacking cooperation between UEs |
| BS + UE semi-static pattern (Mode) | BS and UE together determine the number of feedback resource blocks | Saving signaling overhead and achieving high overall system performance | a small quantity of signaling overhead is needed |
| BS + UE semi-static pattern (Reference number) | BS and UE together determine the number of feedback resource blocks | Saving signaling overhead and achieving high overall system performance | a small quantity of signaling overhead is needed and signaling of this pattern is complicated comparing with Mode based pattern |

Figure 20:
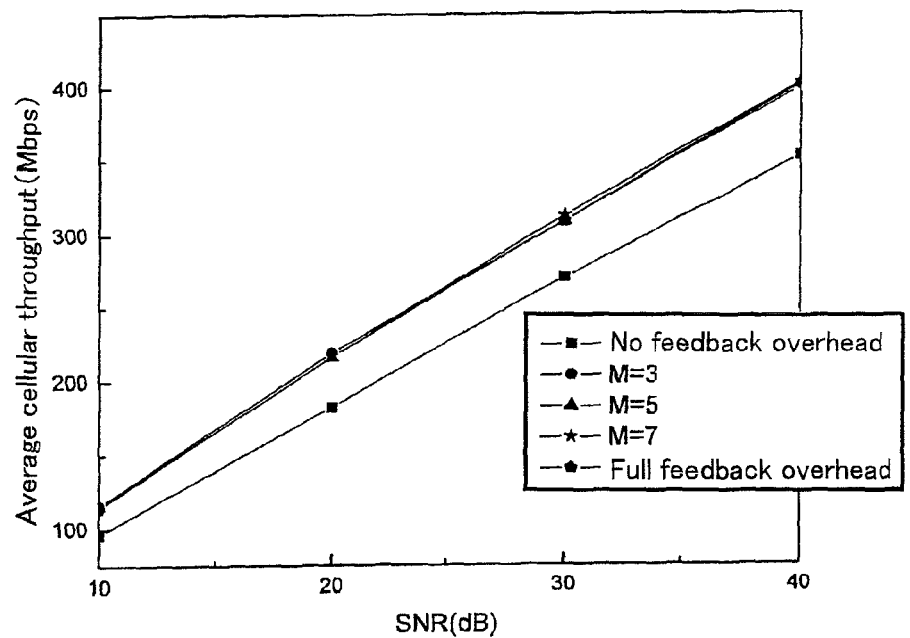
FIG. 20 is a performance chart illustrating relationship between average cellular throughput and SNR.
Figure 21:
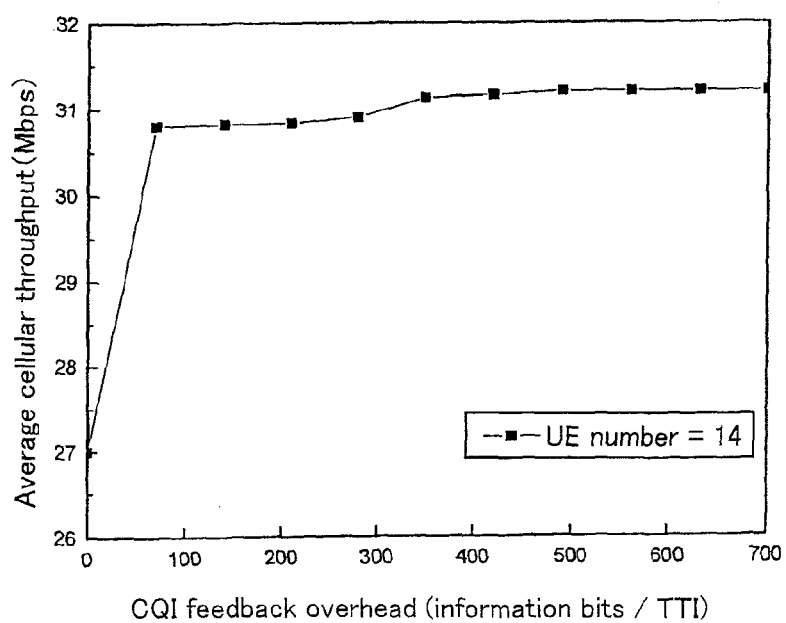
FIG. 21 is a performance chart illustrating relationship between average cellular throughput and CQI feedback overhead.
Figure 22:
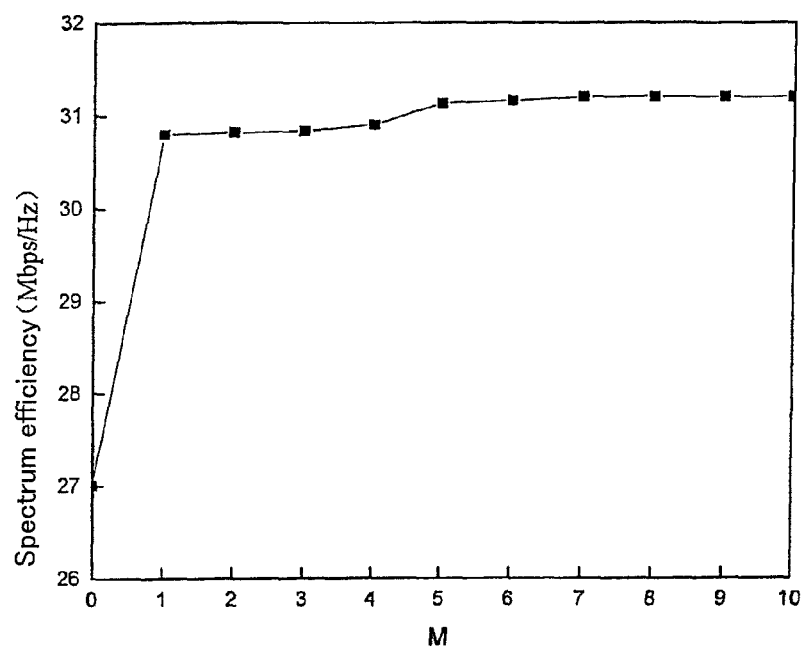
FIG. 22 is a performance chart illustrating relationship between average cellular throughput and M.

FIGS. 20-22 illustrate computer simulation results of performances of the present invention.

The computer simulation adopts following parameters: carrier frequency of the cell is 2 GHz; bandwidth of OFDM single antenna system is 10 MHz; the total number of resource blocks (RB) is 50; the number of UEs within the entire cell is 14 in which 10 UEs are located in center location and 4 UEs are located in edge location; simulation channel is ITU model in which multi-path powers of center users are [−1.78, 0, −7.47, −12.92, −12.62] dB, multi-path delays of center users are [0, 260, 520, 8854, 12760] ns, multi-path powers of edge users are [−12.92, −12.92, −12.92, −12.92, −12.62, −11.99] dB, multi-path delays of edge users are [0, 260, 520, 8854, 12760, 13020] ns; moving speeds of all center user equipments and edge user equipments are all 30 km/h and there are no inter cell interference and co-channel interference. The simulation results are shown in FIGS. 20-22.

FIG. 20 illustrates changes of the cell throughput under different transmission powers of base stations. It can be seen that the cell throughput increases as the feedback amount of CQI information of M RBs increases. In this computer simulation, when M=5, the cell throughput tends to fall into a saturation state, that is, current throughput of the cell approximates to the cell throughput at the time of feeding back CQI information of all resource blocks.

FIG. 21 illustrates the relationship between the cell throughput and the amount of feedback CQI information in uplinks of actual system. When the feedback amount reaches 350 bit, the cell throughput tends to fall into the saturation state. In such case, each UE feeds back the CQI information of 5 RBs, the CQI information of each RB is represented by 5 bits and the total feedback amount of 14 UEs is 350 bits.

FIG. 22 illustrates the relationship between the spectrum utilization efficiency of the cell and the feedback number, M, of the resource blocks. When M=5, the cell throughput tends to fall into the saturation state. It can be concluded from the simulation results that increment of the number M favors the improvement of the cell throughput, however, when M reaches a certain level of value, the cell throughput will not increase distinctly. Therefore, the value of M may be flexibly arranged according to the requirement of the cell throughput so that the cell throughput is made as large as possible by using the CQI information as less as possible.

Therefore, different decision schemes such as the BS dynamic pattern, the UE dynamic pattern, the BS+UE semi-static pattern and etc. may be applied when considering the actual states of the wireless network. The adaptive decision method for the number of feedback resources blocks in downlinks according to the present invention may act as an important theory basis and is provided as a detailed implementation method for the closed-loop feedback scheme of a variety of wireless or mobile networks (cellular network, single frequency broadcasting network, wireless local area network, self-organized network and electronic home network). More specifically, the method of the present invention is particularly applicable to not only the cellular network with 1.25 MHz, 2.5 MHz, 5 MHz, 10 MHz, 15 MHz or 20 MHz bandwidth, but also the B3G (beyond $3^{rd}$ generation) cellular communication system, 4G cellular communication system, wireless local area network or wide area network system.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A mobile communication system in which a user equipment feeds back, to a base station apparatus, a channel quality indicator for downlink, the mobile communication system comprising:
    the base station apparatus, which transmits to the user equipment a mode used by the user equipment to determine a number of resource blocks used to calculate the channel quality indicator, the mode corresponding to a downlink system bandwidth; and
    the user equipment, which determines the number of resource blocks based on the mode, selects the determined number of resource blocks, and calculates the channel quality indicator related to the selected resource blocks.

2. A base station apparatus which receives, from a user equipment, a channel quality indicator for downlink, the base station apparatus comprising:
 a transmitting unit which is configured to transmit, to the user equipment, a mode used by the user equipment to determine a number of resource blocks used to calculate the channel quality indicator, the mode corresponding to a downlink system bandwidth; and
 a receiving unit which is configured to receive, from the user equipment, the channel quality indicator related to the user-equipment selected resource blocks, the number of the resource blocks being determined by the user equipment based on the mode.

3. The base station apparatus according to claim 2, wherein the mode, corresponding to the downlink system bandwidth and used by the user equipment to determine the number of resource blocks used to calculate the channel quality indicator, is determined according to a performance metric of a cell managed by the base station apparatus.

4. The base station apparatus according to claim 3, wherein the performance metric of the cell includes data throughput of the entire cell.

5. The base station apparatus according to claim 3, wherein the performance metric of the cell includes data throughput of the cell edge.

6. The base station apparatus according to claim 3, wherein the performance metric of the cell includes a total number of the user equipments in the cell.

7. The base station apparatus according to claim 2, wherein the transmitting unit is configured to transmit, to the user equipment, the mode via broadcast channel.

8. The base station apparatus according to claim 2, wherein the transmitting unit is configured to transmit, to the user equipment, the mode via physical downlink control channel.

9. A user equipment which transmits, to a base station apparatus, a channel quality indicator for downlink, the user equipment comprising:
 a receiving unit which is configured to receive, from the base station apparatus, a mode used by the user equipment to determine a number of resource blocks used to calculate the channel quality indicator, the mode corresponding to a downlink system bandwidth; and
 a calculating unit which is configured to determine the number of resource blocks based on the mode, select the determined number of resource blocks, and to calculate the channel quality indicator related to the selected resource blocks.

10. The user equipment according to claim 9, wherein the mode, corresponding to the downlink system bandwidth and being used to determine, by the user equipment, the number of resource blocks used to calculate the channel quality indicator, is determined according to a performance metric of a cell managed by the base station apparatus.

11. The user equipment according to claim 10, wherein the performance metric of the cell includes data throughput of the entire cell.

12. The user equipment according to claim 10, wherein the performance metric of the cell includes data throughput of the cell edge.

13. The user equipment according to claim 10, wherein the performance metric of the cell includes a total number of user equipments in the cell.

14. The user equipment according to claim 10, wherein the performance metric of the cell includes system bandwidth of downlink.

15. The user equipment according to claim 9, wherein the receiving unit is configured to receive, from the base station apparatus, the mode via broadcast channel.

16. A communication method of a base station apparatus which receives, from a user equipment, a channel quality indicator for downlink, the communication method comprising:
 transmitting, to the user equipment, a mode used by the user equipment to determine a number of resource blocks used to calculate the channel quality indicator, the mode corresponding to a downlink system bandwidth; and
 receiving, from the user equipment, the channel quality indicator related to the user-equipment selected resource blocks, the number of the resource blocks being determined by the user equipment based on the mode.

17. The communication method according to claim 16, wherein the mode, corresponding to the downlink system bandwidth and used by the user equipment to determine the number of resource blocks used to calculate the channel quality indicator, is determined according to a performance metric of a cell managed by the base station apparatus.

18. The communication method according to claim 17, wherein the performance metric of the cell includes data throughput of the entire cell.

19. The communication method according to claim 17, wherein the performance metric of the cell includes data throughput of the cell edge.

20. The communication method according to claim 17, wherein the performance metric of the cell includes a total number of the user equipments in the cell.

21. The communication method according to claim 16, wherein the base station apparatus transmits, to the user equipment, the mode via broadcast channel.

22. The communication method according to claim 16, wherein the base station apparatus transmits, to the user equipment, the mode via physical downlink control channel.

23. A communication method of a user equipment which transmits, to a base station apparatus, a channel quality indicator for downlink, the communication method comprising:
 receiving, from the base station apparatus, a mode used by the user equipment to determine a number of resource blocks used to calculate the channel quality indicator, the mode corresponding to a downlink system bandwidth
 determining the number of resource blocks based on the mode;
 selecting the determined number of resource blocks; and
 calculating the channel quality indicator related to the selected resource blocks.

24. The communication method according to claim 23, wherein the mode, corresponding to the downlink system bandwidth and used by the user equipment to determine the number of resource blocks used to calculate the channel quality indicator, is determined according to a performance metric of a cell managed by the base station apparatus.

25. The communication method according to claim 24, wherein the performance metric of the cell includes data throughput of the entire cell.

26. The communication method according to claim 24, wherein the performance metric of the cell includes data throughput of the cell edge.

27. The communication method according to claim 24, wherein the performance metric of the cell includes a total number of user equipments in the cell.

28. The communication method according to claim 23, wherein the user equipment receives, from the base station apparatus, the mode via broadcast channel.

29. The communication method according to claim 23, wherein the user equipment receives, from the base station apparatus, the mode via physical downlink control channel.

* * * * *